US008429657B2

(12) United States Patent
Zoll et al.

(10) Patent No.: US 8,429,657 B2
(45) Date of Patent: Apr. 23, 2013

(54) GLOBAL AVOIDANCE OF HANG STATES VIA PRIORITY INHERITANCE IN MULTI-NODE COMPUTING SYSTEM

(75) Inventors: Michael Zoll, Foster City, CA (US);
Angelo Pruscino, Los Altos, CA (US);
Wilson Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1127 days.

(21) Appl. No.: 12/150,393

(22) Filed: Apr. 28, 2008

(65) Prior Publication Data
US 2009/0271794 A1 Oct. 29, 2009

(51) Int. Cl.
*G06F 9/46* (2006.01)
(52) U.S. Cl.
USPC .......................................... 718/103
(58) Field of Classification Search .................. None
See application file for complete search history.

(56) References Cited

U.S. PATENT DOCUMENTS

| | | | |
|---|---|---|---|
| 6,965,893 B1 | 11/2005 | Chan et al. | |
| 7,334,229 B1 * | 2/2008 | McDonald et al. | 718/104 |
| 2002/0138679 A1 * | 9/2002 | Koning et al. | 710/244 |
| 2005/0125789 A1 * | 6/2005 | Dijkstra et al. | 718/100 |
| 2006/0282836 A1 * | 12/2006 | Barker | 718/103 |
| 2006/0288144 A1 | 12/2006 | Chan et al. | |
| 2007/0043728 A1 | 2/2007 | Chan et al. | |
| 2007/0192524 A1 | 8/2007 | Chan et al. | |
| 2008/0082533 A1 | 4/2008 | Wang et al. | |
| 2008/0168454 A1 * | 7/2008 | Choi et al. | 718/103 |

OTHER PUBLICATIONS

Ngolah, C.F., Yingxu Wang, Xinming Tan. "Implementing task scheduling and event handling in RTOS+" Conference on Electrical and Computer Engineering, May 2-5, 2004, vol. 3 pp. 1523-1526.*
Akgul, B. E. S.; Mooney III, V. J.; Thane, H.; Kuacharoen, P. "Hardware support for priority inheritance" In Proceedings. 24th IEEE International Real-Time Systems Symposium, pp. 246-255;xiii+442. IEEE Comput. Soc, 2003.*

* cited by examiner

*Primary Examiner* — Jacob A Petranek
(74) *Attorney, Agent, or Firm* — Kraguljac Law Group, LLC

(57) ABSTRACT

Systems, methods, and other embodiments associated with avoiding resource blockages and hang states are described. One example computer-implemented method for a clustered computing system includes determining that a first process is waiting for a resource and is in a blocked state. The resource that the first process is waiting for is identified. A blocking process that is holding the resource is then identified. A priority of the blocking process is compared with a priority the first process. If the priority of the blocking process is lower than the priority of the first process, the priority of the blocking process is increase. In this manner the blocking process can be scheduled for execution sooner and thus release the resource.

26 Claims, 6 Drawing Sheets

GLOBAL AVOIDANCE OF HANG STATES VIA PRIORITY INHERITANCE IN MULTI-NODE COMPUTING SYSTEM

BACKGROUND

Within the context of computer systems, many types of resources can be shared among processes. However, many resources, though sharable, may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

The entity responsible for granting locks on resources is referred to as a lock manager. In a single node database system, a lock manager will typically include one or more processes on a node. In a multiple-node system, such as a multi-processing machine, a clustered system, or a local area network, a lock manager may include processes distributed over numerous nodes. A lock manager that includes components that reside on two or more nodes is referred to as a distributed lock manager.

In computer science, deadlock refers to a condition when two or more processes are each waiting for another to release a resource, or more than two processes are waiting for resources in a circular chain. Deadlock is a common problem in multiprocessing where many processes share a specific type of mutually exclusive resource lock.

For example, when processes are executed with different operating system priorities or processes are given different scheduling treatments, a deadlock or starvation on processes for resources can happen, which can lead to database hang. In one example, a process P1 waiting for resources may be scheduled to run on a frequent basis but process P2 is holding the resources (needed by P1). If process P2 is not scheduled enough time or is not scheduled to be executed by a processor at all, P2 cannot finish its task and thus cannot release the resources it is holding. Hence P1 is in a hang state and may time out, and P1 and P2 are in a deadlock/starvation situation.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
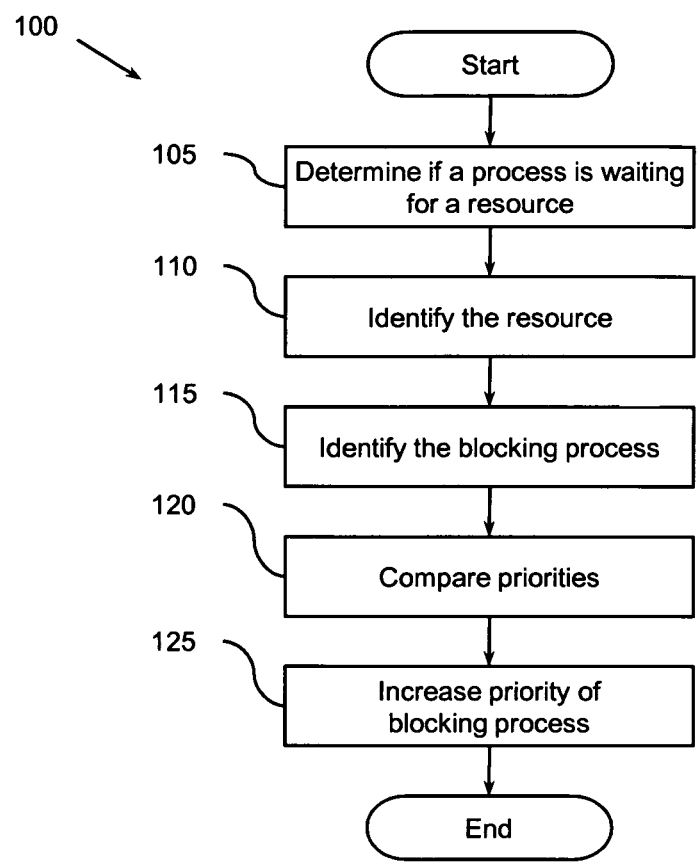
FIG. 1 illustrates an example method associated with handling a hang state and resource blockage.

Example systems, methods, computer-readable media, and other embodiments are described herein that are associated with avoiding or reducing deadlock/starvation situations during process execution. In one example of a distributed computing system, global avoidance of resource blocks can be performed by identifying the resource that a blocked process is waiting for and identifying the process (e.g. blocking process) that is holding the resource. Since the two processes can be on different server nodes in the system, local detection for a hang state does not reveal the hang situation. Once the blocking process is found, the priority of the blocking process can be increased if it is lower that the priority of the waiting process. In one example, the higher priority of the waiting process can be lent to the lower priority blocking process (e.g. priority lending). This may help the lower priority process to be scheduled and finish executing its task sooner so it can release the held resource and allow the waiting process to gain access to the resource.

In another embodiment where a clustered database is implemented having multiple database instances, any hang/starvation situation caused by scheduling issues and blocked resources may or may not be detected by the database itself. Sometimes a hang can only be detected by a database administrator (DBA). The database instance involved in the hang may crash, may terminate automatically, or may have to be shutdown. In either of these cases, this can cause slowdown and interruption to database operations. The systems and methods described herein can reduce or avoid such hang/starvation events and increase availability of the whole system.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a compact disk, other optical medium, a RAM, a ROM, a memory chip or card, a memory stick, and other media that can store or be configured with instructions that a computer, a processor or other electronic device can read and execute.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software stored in a computer-readable medium, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

With reference to FIG. 1, an exemplary method 100 is illustrated that is associated with reducing a resource blockage. A resource that is blocked from being accessed by a process may lead to a deadlock/starvation situation. In one embodiment the method is a computer-implemented method for a clustered computing system, like a clustered database system but can be implemented with any distributed operating system configuration.

For purposes of the discussion, assume that in a computing system, one or more processes are executing and one or more processes are waiting to be executed. Each process may require access to a particular resource (e.g. a lock, a latch, or other resource) in order to complete its scheduled task(s). Suppose a process P1 has been allocated resource R1, thereby not permitting other processes to get access to resource R1 until process P1 releases R1.

A hang/starvation situation may occur when a second process P2 is waiting for resource R1 for some time and then falls into a wait state or even a time-out state if process P1 does not release resource R1. Process P1 will be referred to as the blocking process or holding process since it is holding the resource and thus blocking the execution of process P2. Process P2 will be referred to as the waiting process or blocked process since its execution is blocked and it is in a blocked state.

With reference to FIG. 1, the method 100 may initiate by determining that one process (e.g. a blocked process) is waiting for a resource and is in a blocked state (block 105). The determining can be performed by, for example, receiving a notice from the blocked process that it is in a blocked/wait state or by accessing a memory location that maintains a list of processes that are in a wait state (e.g. process state information). In one embodiment, the clustered system can include a software utility like a hang manager for managing and detecting bottlenecks. A process in a wait state would send a notice/message to the hang manager indicating that it is in a wait state and a list of waiting processes can be maintained. Thus, the list can be accessed to determine which processes are waiting. Along with each process, other process state information can be collected such as priority of each process, timing information, location of the process, and/or other information about the process.

With further reference to FIG. 1, if a process is waiting for a resource, then the method can identify the resource that the process is waiting for (block 110). In one embodiment, the computing system can include a utility that controls the allocation of system resources like a lock manager. The lock manager can maintain a list of resources and which processes are currently holding them (e.g. resource state information), and can maintain a list of processes waiting for a certain resource(s). Each resource has a unique resource identified (ID) assigned to it. Thus, the method 100 can request or access the list to determine the resource ID.

Once the resource is identified, the method can then identify the process (referred to as the blocking process) that is holding the resource (block 115). This can be performed by using the lock manager since it maintains a list of resources and which processes are currently holding them. Thus by knowing the resource ID, the process holding that resource can be identified.

In another embodiment where the clustered computing system includes a plurality of computing nodes, based on the identity of the resource, the blocking process is identified globally across all nodes in the clustered computing system. Thus the method determines the blocking process where ever it may be in the cluster. This can be performed by communicating with the lock managers of the cluster nodes, communicating with a distributed lock manager, or otherwise accessing global state information from the cluster. In one example, identifying the blocking process includes determining a process identifier assigned to the blocking process.

Once the blocking process is identified, the method 100 can then compare a priority of the blocking process with a priority the waiting process (block 120). If the priority of the blocking process is lower than the priority of the waiting process, the priority of the blocking process can be increased or boosted so that it may be scheduled and executed quicker (block 125). The objective being that the sooner the blocking process releases the resource, the sooner the waiting process can obtain the resource and execute. The deadlock/starvation situation can then be avoided or at least reduced.

Figure 2:
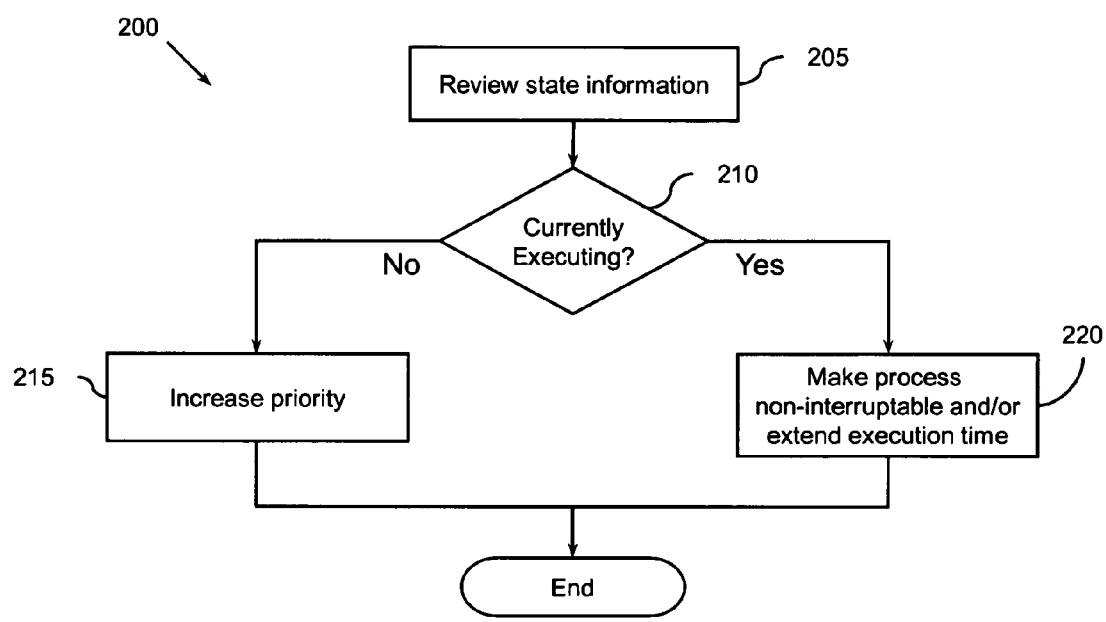
FIG. 2 illustrates an example method associated with changing a priority of a process.

In another embodiment, the method 100 can perform a more detail process before simply increasing the priority of the blocking process. For example, FIG. 2 shows another method that can be implemented as part of block 120 of FIG. 1 before increasing the priority. The method 200 can review the process state information the blocking process before deciding what action to take.

For example, by reviewing the state information of the blocking process, the method 200 can determine whether the blocking process is currently executing or waiting to be executed (block 210). If the blocking process is waiting for execution, then the priorities can be compared and if the blocking process is lower than the waiting process, the blocking process priority is increased in order to get it scheduled for execution sooner (block 215). If the priority of the blocking process is higher than the waiting process, then the priority does not need to be increased and the processes are allowed to execute as scheduled.

If at block 210 it is determined that the blocking process is currently executing, then increasing its priority may be performed by instructing the operating system to make the process non-interruptible and/or to extend its quantum (e.g. the time for execution) (block 220). By doing this, the blocking process may complete execution sooner and release the resource thereby reducing the hang time of the waiting process.

In another example, if the waiting process is on a first node in the clustered computing system and the blocking process is on a second node, then the method can including sending a message to the second node to cause an operating system local to the second node to increase the priority of the blocking process.

In another embodiment, there may be multiple processes waiting for the same resource creating a blocking chain. If a blocking chain exists, then the above method can be repeated for the next or subsequent blocking and waiting processes that are involved in the chain.

Figure 3:
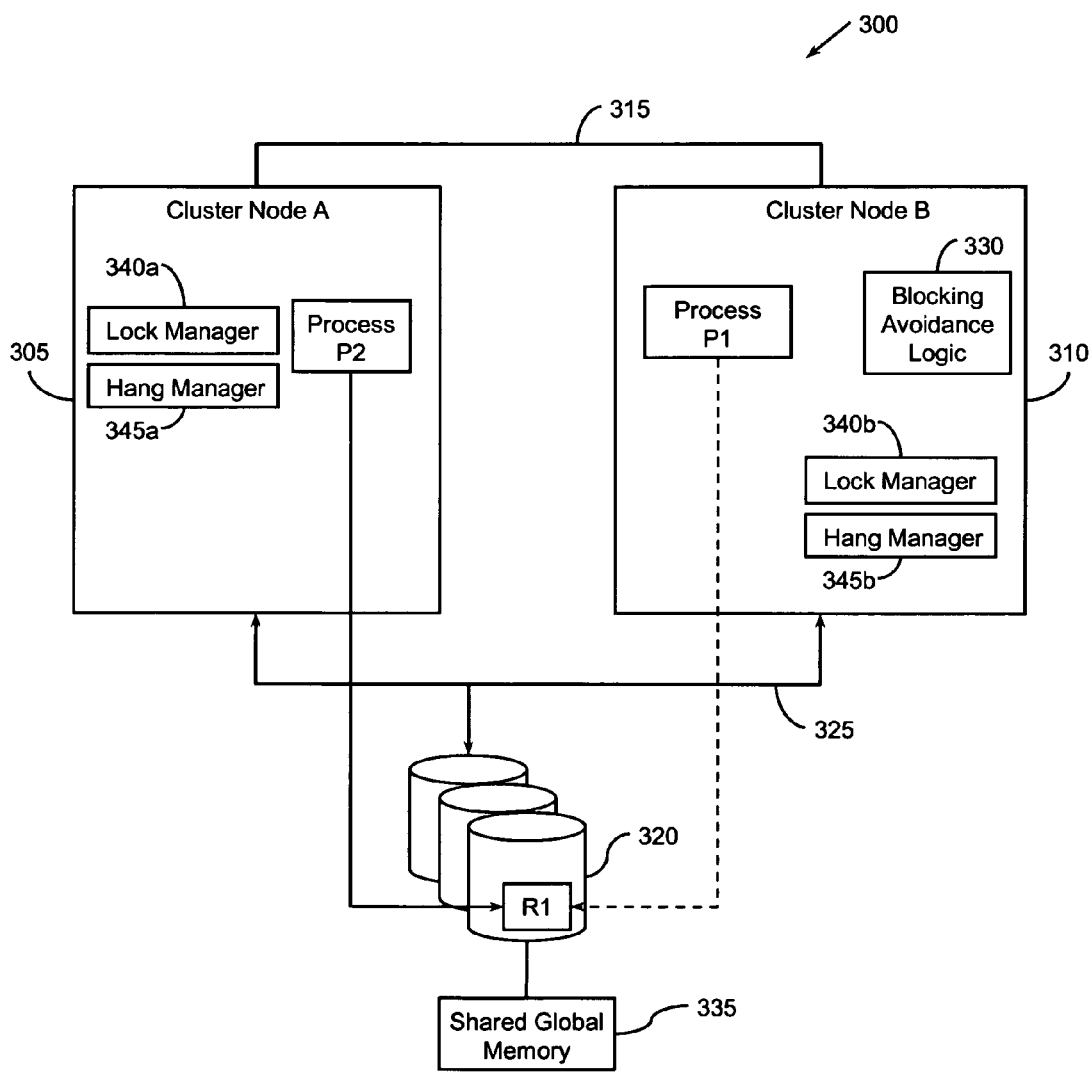
FIG. 3 illustrates another example system associated with reducing resource blocks.
Figure 4:
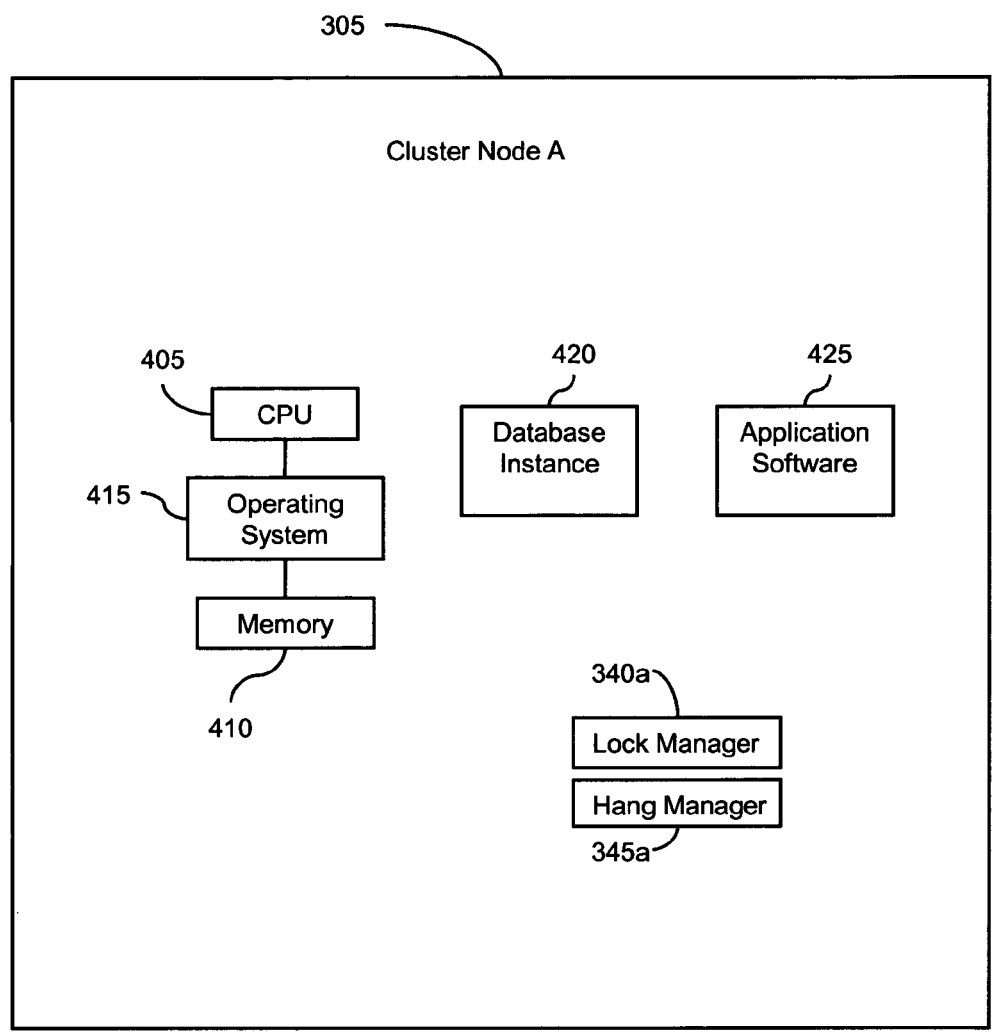
FIG. 4 illustrates one embodiment of a computing node as shown in FIG. 3.

With reference to FIG. 3, one embodiment of a clustered computing system 300 is shown. A cluster is a group of independent systems, which perform as a single system. The cluster 300 can include a number of servers or nodes 305 and 310, a cluster node-to-node interconnect 315 like a high-speed bus, and possibly a set of shared disks 320 connected over a network 325. As shown in FIG. 4, one embodiment of the server/node 305 in the cluster can have one or multiple processors 405, memory 410, an operating system 415, a database instance 420 as well as application software 425. With reference again to FIG. 3, database instances in each node can be configured as a clustered database system and can share data residing on shared disks 320 or can be configured to share no data.

With continued reference to FIG. 3, one or more nodes can also include a blocking avoidance logic 330. The blocking avoidance logic 330, when executed, is configured to detect resource blockage and attempt to reduce the extent to which a hang/deadlock state occurs. For example, the blocking avoidance logic 330 can be configured to determine when a process is a wait state (e.g. a waiting process) and is waiting for a resource. As previously explained, this determination can be made by reviewing process state information that contains a list of processes on the system and their current states. In one example, the process state information can be maintained in shared global memory 335 (e.g. within a portion of the shared disks 320) that is accessible by all nodes in the cluster. Of course, access to the shared global memory 335 can be restricted to components having appropriate access rights.

In another example, a cluster node can include a software implemented lock manager (340a in node A, 340b in node B) as previously described, and a hang manager (345a in node A, 345b in node B). The hang manager 345a maintains a list of processes that are in a wait state. In one embodiment, the hang manager can be configured on each of the nodes in the cluster to allow for easier inter-node hang diagnostics. Each hang manager can be configured to communicate with other hang managers to obtain process state information. The process state information can be maintained locally in each node and/or as part of the shared global memory 335. In another embodiment, each node can include a lock manager.

If a process (e.g. process P1 in node B) is in a wait state and waiting for a resource, the blocking avoidance logic 330 would determine an identity of a blocking process to which the resource is allocated. Since the blocking process may not be a local process (e.g. not on the same node as the waiting process P1), the system is configured to identify the blocking process globally in the cluster.

In FIG. 3, process P1 is waiting for resource R1. This is represented by the dashed line. However, process P2 (on node A) is currently holding resource R1. Suppose R1 is a portion of a database and process P2 has been allocated an exclusive lock on resource R1 thereby prohibiting any other process from gaining access. By accessing the process state information from the hang manager, the blocking avoidance logic 330 can identify the waiting process (e.g. process P1) and can determine the identity of the resource it is waiting for (e.g. resource R1).

To determine the identity of the blocking process, the blocking avoidance logic 330 can communicate with one or more lock managers in the cluster to determine who is holding resource R1. Since the lock manager is responsible for granting rights to the resources, the lock manager knows who is holding the resource and can return the identity of process P2. The identity can include a process identifier and/or other identification information (e.g. process name, priority, its local node, etc).

In another embodiment, the identity of the blocking process can be determined using the shared global memory 335 that maintains process and resource state information. The shared global memory 335 can be configured to store process state information that identifies the current state of processes on the clustered computing system and resource state information that identifies resources on the clustered computing system and which process holds a resource. The blocking avoidance logic 330 can also be configured to search the process and resource state information to identify the waiting process, the resource and the blocking process. It will be appreciated that the shared global memory 335 can be implemented with the lock manager and hang manager mechanisms where the mechanisms use the shared global memory 335 to maintain some or all of their data.

Once the blocking process P2 is identified, the blocking avoidance logic 330 can cause an operating system local to the blocking process P2 to increase an execution priority of the blocking process if the execution priority is lower than an execution priority of the waiting process. For example, a message with instructions can be generated and transmitted to the operating system, which may be on a different node. Thus, the operating system on node A (local to process P2) can be instructed to increase the priority of process P2 in an effort to get process P2 scheduled for execution quicker. This scenario presumes that P2 is not currently executing. Other ways for increasing the priority and handling the scenario when process P2 is currently executing are described with reference to FIGS. 1 and 2.

In another embodiment, the blocking avoidance logic 330 is configured to cause the operating system to increase the priority by first determining a node to which the blocking process is local. This can be determined, for example, from the process state information of the blocking process, which can indicate where the process is located (e.g. node A). Once the node is determined, a message can be transmitted to node A (for processing by the operating system) where the message includes instructions and process state information of the waiting process.

The operating system of node A can be configured to change the priority of the blocking process based on the process state information of the waiting process and the execution priority of the blocking process. For example, the priority of the waiting process can be part of the process state information. Thus, the operating system can compare the priorities of the waiting and blocking processes. If the priority of the blocking process is lower, it can be increased. Various examples of increasing the priority are described with reference to FIGS. 1 and 2. In another example, the priority can be set to at least the same priority of the waiting process thereby lending the priority of the waiting process to the blocking process. In another example, increasing the priority may include rescheduling the blocking process with a higher priority so that it can be executed sooner.

Once the blocking process executes its task and releases the resource, the next scheduled process can then obtain the resource. If there is a blockage chain where additional processes are waiting for the same resource and the next process that holds the resource is hanging, the above functions can be repeated until the blockage is alleviated.

It will be appreciated that the blocking avoidance logic 330 can be implemented as a separate executable process such as a process that monitors the system for hang states of all existing processes. Alternately, the blocking avoidance logic 330 can be implemented as part of the process P1 itself in addition to its normal executable instructions. In this manner, the process P1 can directly initiate the blockage avoidance actions when it falls into a wait state.

Figure 5:
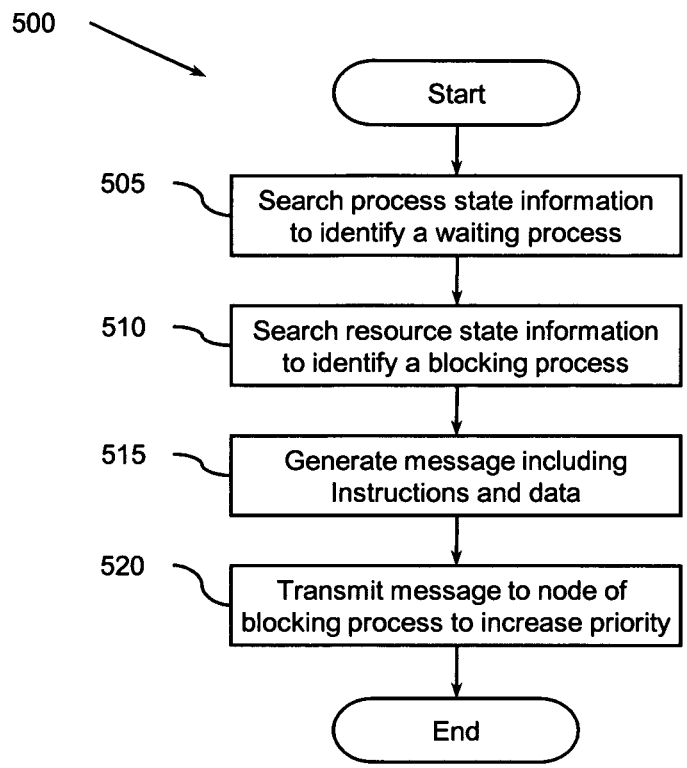
FIG. 5 illustrates another embodiment of a method associated with handling resource blocks.

In another embodiment as shown in FIG. 5, a computer-readable medium is provided having stored therein computer-executable instructions for handling a hang situation in a distributed computing system having a plurality of computing nodes. When the computer-executable instructions are executed by a computer, they cause the computer to perform a method 500. The method 500 includes searching process state information of the distributed computing system to identify a waiting process from a first computing node (block 505). As described previously, the waiting process is in a blocked state and waiting for a resource. A resource identifier of the resource can also be retrieved.

Once the waiting process and resource is identified, the method searches resource state information of the distributed computing system to identify the blocking process (block 510). The blocking process is holding the resource and thus the resource identifier would be associated with or assigned to the blocking process. Therefore in one example, the search is based on and uses the resource identifier to find the blocking process. Additionally the blocking process may be on a different computing node in the distributing computing system thus a simple local memory search will not reveal the blocking process.

When the blocking process is identified, a message is generated that includes instructions and data with at least a priority of the waiting process, an identifier of the blocking process, and the resource identifier of the resource (block 515). The message is then transmitted to the second node to cause an execution priority of the blocking process to be increased if the execution priority is lower than the waiting process (block 520).

It will be appreciated that the actions taken to increase the priority as previously described in the other embodiments can also be implemented here. In another example, the message transmitted to the second node can be configured to cause an operating system local to the second node to increase the execution priority of the blocking process.

Figure 6:
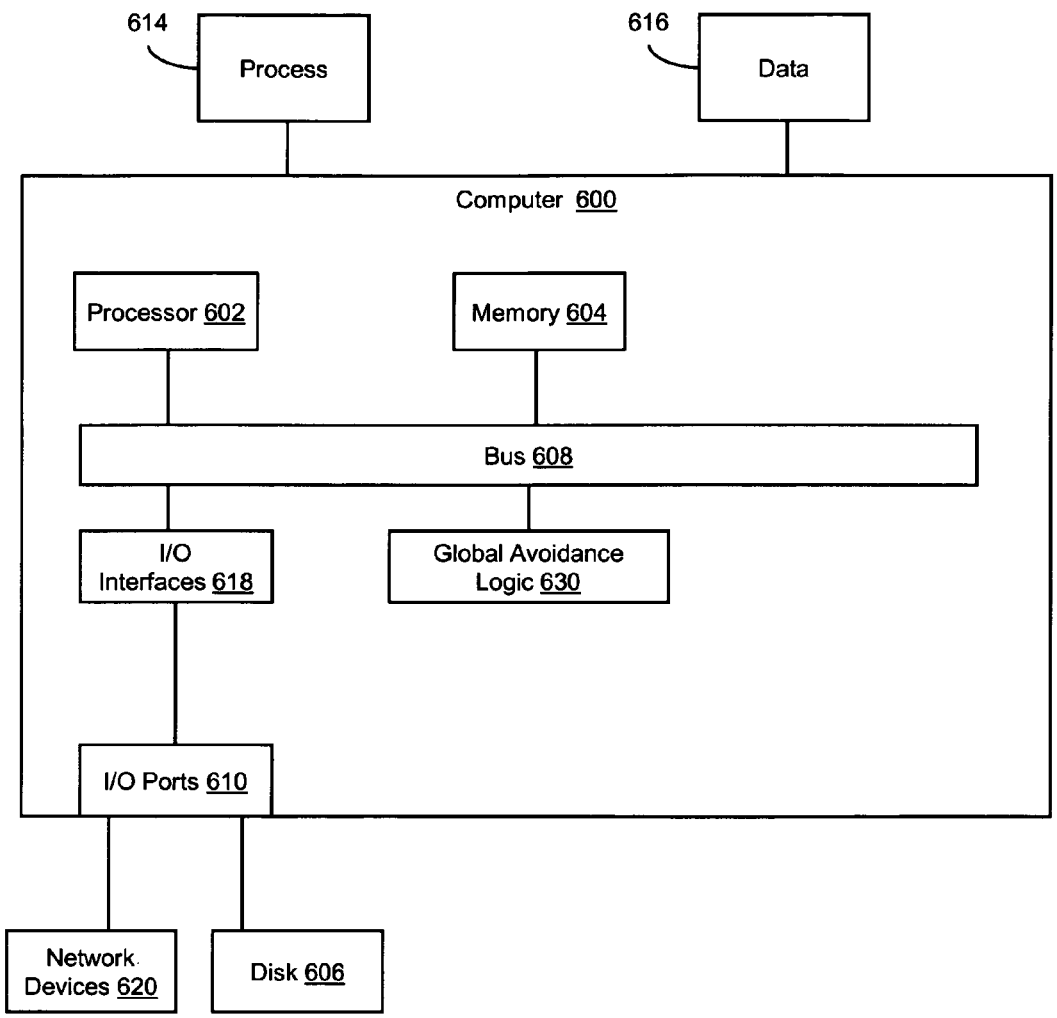
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a global avoidance logic 630 configured to facilitate handling a hang situation of a blocked process(es) as described with reference to the other figures. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602, and/or as an executable process.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method for a clustered computing system, the method comprising:
    determining that a first process is waiting for a resource and that the first process is in a blocked state by accessing process state information from a shared global memory on a remote node, where the process state information identifies processes and a current state of each process, where the shared global memory is shared and remotely accessed by multiple nodes in the clustered computing system;
    identifying the resource that the first process is waiting for;
    identifying, from the shared global memory, a blocking process that is holding the resource and a processing state of the blocking process;
    comparing a priority of the blocking process with a priority of the first process; and
    selectively increasing the priority of the blocking process based, at least in part, on the priority and the process state information of the blocking process.

2. The computer-implemented method of claim 1 where if the first process is on a first node in the clustered computing system and the blocking process is on a second node, then sending a message to the second node to cause an operating system local to the second node to increase the priority of the blocking process.

3. The computer-implemented method of claim 1 where selectively increasing the priority of the blocking process includes increasing the priority if the priority of the blocking process is lower than the priority of the first process and the blocking process is not currently executing.

4. The computer-implemented method of claim 1 comprising: selectively maintaining the blocking process in a currently executing state based, at least in part, on the processing state information of the blocking process, where selectively maintaining the blocking process in a currently executing state includes:
determining if the blocking process is currently executing based, at least in part, on the process state information for the blocking process; and
selectively instructing an operating system to prevent preemption of the blocking process by making the blocking process non-interruptable without increasing the priority of the blocking process or extending an execution time for the blocking process.

5. The computer-implemented method of claim 1 where the clustered computing system includes a plurality of computing nodes; and
where identifying the blocking process includes identifying the blocking process by using the identity of the resource to search for the identity of the blocking process in the remote node from the process state information in the shared global memory on the remote node.

6. The computer-implemented method of claim 1, where determining that the first process is waiting includes a management process detecting a timeout by the first process and searching the process state information in the shared global memory for waiting processes that are blocked by another process.

7. The computer-implemented method of claim 1 further including:
determining whether a blocking chain is present where multiple processes are waiting for the resource, and if present, repeating the method for a subsequently blocked process.

8. The computer-implemented method of claim 1 where the method is initiated by the waiting process.

9. The computer-implemented method of claim 1, wherein selectively increasing the priority of the blocking process includes lending the priority of the first process to the blocking process and returning the lent priority when the blocking process releases the resource.

10. The computer-implemented method of claim 1, further comprising:
after the resource is released by the blocking process, passing the increased priority from the blocking process to a subsequent process that uses the resource, wherein the subsequent process is the first process.

11. A clustered computing system, comprising:
a plurality of computing nodes for executing processes, each of the computing nodes including a processor, an operating system, and a database instance that is configured as part of a clustered database system;
a shared global memory that is shared on a remote node of the computing nodes and accessed by the plurality of computing nodes in the clustered database system;
a blocking avoidance logic embodied in one or more of the plurality of nodes and when executed is configured to:
determine when a process in a first node of the computing nodes is in a wait state that is waiting for a resource, the process being a waiting process;
determine an identity and a processing state of a blocking process from the shared global memory on the remote node, where the blocking process is part of a second node of the computing nodes, to which the resource is allocated; and
selectively causing an operating system local to the blocking process to increase an execution priority of the blocking process based, at least in part, on an execution priority of the waiting process and the process state information of the blocking process.

12. The computing system of claim 11 where the shared global memory having stored therein:
process state information that identifies a current state and identifiers of processes on the clustered computing system; and
resource state information that identifies resources on the clustered computing system and identifies which process holds a resource.

13. The clustered computing system of claim 11 further including a lock manager implemented to control allocation of resources to processes, and to maintain a list of processes waiting for resources and a list of resources that are allocated to a process.

14. The computing system of claim 11 further including:
a hang manager configured to maintain a list of processes that are in a wait state; and
where the blocking avoidance logic is configured to access the hang manager to determine when a process is a waiting process.

15. The computing system of claim 11 where the blocking avoidance logic is further configured to:
identify the resource that the waiting process is waiting for by searching the shared global memory on the remote node;
based on the identity of the resource, determine the identity of the blocking process to which the resource is allocated.

16. The computing system of claim 15 where resource is identified by a resource identifier that was assigned to the resource.

17. The computing system of claim 11 where the blocking avoidance logic is configured to selectively cause the operating system to increase the priority by:
determining a node to which the blocking process is local; and
transmitting a message to the node including state information of the waiting process;
where the message is configured to cause the operating system to change the priority of the blocking process based on the state information of the waiting process and the execution priority of the blocking process, where the priority of the blocking process is increased when the blocking process is not executing and if the execution priority of the blocking process is lower than the execution priority of the waiting process.

18. The computing system of claim 11 where the blocking avoidance logic is configured to:
search process state information of the plurality of computing nodes to identify the waiting process and determine a resource identifier of the resource that the waiting process is waiting for; and
search resource state information of the plurality of computing nodes to identify the blocking process using the resource identifier.

19. The computing system of claim 11 where the global avoidance logic is configured to determine when the process is waiting by detecting a timeout by the process and search the process state information in the global shared memory for waiting processes that are blocked by another process.

20. The computing system of claim 11, wherein selectively causing an operating system local to the blocking process to increase the execution priority of the blocking process includes lending the execution priority of the waiting process to the blocking process and returning the lent execution priority of the waiting process when the blocking process releases the resource.

21. The computing system of claim 11, further comprising:
after the resource is released by the blocking process, passing the increased execution priority from the blocking process to a subsequent process that uses the resource, wherein the subsequent process is the waiting process.

22. A non-transitory computer-readable medium storing computer-executable instructions that when executed by a computer cause the computer to perform a method, the method comprising:
searching process state information of a distributed computing system having a plurality of computing nodes to identify a waiting process from a first computing node, where the waiting process is in a blocked state and waiting for a resource;
searching resource state information of the distributed computing system to identify a blocking process from a different computing node in the distributing computing system using an identifier of the resource, where the blocking process is holding the resource, where the process state information and the resource state information are stored in a global memory shared by the plurality of computing nodes, and where the global memory is on a remote node in the plurality of computing nodes and is accessed by the plurality of computing nodes;
generating a message that includes instructions and data with at least a priority of the waiting process, an identifier of the blocking process, and the identifier of the resource; and
transmitting the message to the second node to cause an execution priority of the blocking process to be increased if the execution priority is lower than the waiting process.

23. The non-transitory computer-readable medium of claim 22 further including:
determining the identifier associated with the resource; and
where identifying the blocking process is based on the resource identifier, where increasing an execution priority of the blocking process includes extending an execution time of the blocking process if the blocking process is currently executing and increasing an execution priority of the blocking process if the blocking process is not currently executing.

24. The non-transitory computer-readable medium of claim 22 where transmitting the message to the second node causes an operating system local to the second node to increase the execution priority of the blocking process if the execution priority is lower than the waiting process.

25. The non-transitory computer-readable medium of claim 22, wherein causing the execution priority of the blocking process to be increased includes lending the execution priority of the waiting process to the blocking process and returning the lent priority when the blocking process releases the resource.

26. The non-transitory computer-readable medium of claim 22, further comprising:
after the resource is released by the blocking process, passing the increased execution priority from the blocking process to a subsequent process that uses the resource.

* * * * *

UNITED STATES PATENT AND TRADEMARK OFFICE
CERTIFICATE OF CORRECTION

PATENT NO. : 8,429,657 B2  
APPLICATION NO. : 12/150393  
DATED : April 23, 2013  
INVENTOR(S) : Zoll et al.

Page 1 of 1

It is certified that error appears in the above-identified patent and that said Letters Patent is hereby corrected as shown below:

On Title page, in column 2, under "Abstract", line 8, delete "priority the" and insert -- priority of the --, therefor.

In the Specification:

In column 9, line 56, delete "i/o" and insert -- I/O --, therefor.

In column 9, line 64, before "interfaces" delete "i/o" and insert -- I/O --, therefor.

In column 9, line 64, before "ports" delete "i/o" and insert -- I/O --, therefor.

Signed and Sealed this  
Sixth Day of August, 2013

Teresa Stanek Rea  
*Acting Director of the United States Patent and Trademark Office*